United States Patent
Nadimpalli et al.

(10) Patent No.: US 11,232,637 B2
(45) Date of Patent: Jan. 25, 2022

(54) METHOD AND SYSTEM FOR RENDERING CONTENT IN LOW LIGHT CONDITION FOR FIELD ASSISTANCE

(71) Applicant: Wipro Limited, Bangalore (IN)

(72) Inventors: Vivek Kumar Varma Nadimpalli, Hyderabad (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 5 days.

(21) Appl. No.: 16/834,729

(22) Filed: Mar. 30, 2020

(65) Prior Publication Data
US 2021/0256764 A1 Aug. 19, 2021

(30) Foreign Application Priority Data
Feb. 17, 2020 (IN) .............................. 202041006823

(51) Int. Cl.
| | | |
|---|---|---|
| G06T 19/00 | (2011.01) | |
| G06T 19/20 | (2011.01) | |
| G06K 9/62 | (2006.01) | |
| G06N 3/04 | (2006.01) | |

(52) U.S. Cl.
CPC .......... G06T 19/006 (2013.01); G06K 9/6256 (2013.01); G06N 3/049 (2013.01); G06T 19/20 (2013.01)

(58) Field of Classification Search
CPC ..... G06T 19/006; G06T 19/20; G06K 9/6256; G06N 3/049
See application file for complete search history.

(56) References Cited

U.S. PATENT DOCUMENTS

| | | | |
|---|---|---|---|
| 2014/0184643 A1 | 7/2014 | Friend | |
| 2016/0180721 A1* | 6/2016 | Otulic | B60Q 9/00 701/2 |
| 2020/0302634 A1* | 9/2020 | Pollefeys | G06T 7/70 |
| 2020/0379461 A1* | 12/2020 | Singh | G05D 1/0088 |
| 2021/0129836 A1* | 5/2021 | Nguyen | G06K 9/00825 |
| 2021/0133932 A1* | 5/2021 | Lee | G06T 7/90 |

FOREIGN PATENT DOCUMENTS

| | | |
|---|---|---|
| CN | 106383587 A | 2/2017 |
| CN | 108681695 A | 10/2018 |
| CN | 108780228 A | 11/2018 |

* cited by examiner

Primary Examiner — Grace Q Li
(74) Attorney, Agent, or Firm — Finnegan, Henderson, Farabow, Garrett & Dunner, LLP

(57) ABSTRACT

The present invention discloses a method and a system for rendering content in low light condition for field assistance. The method comprising receiving real-time input data from a user device in a low light condition, identifying at least one object from the real-time input data and corresponding operational state of the at least one object based on a correlation of the at least one object in the input data and corresponding operational state of the at least object with pre-stored objects and corresponding operational state of the pre-stored objects, predicting at least one action to be performed on the identified at least one object, extracting an Augmented Reality (AR) object associated with the identified at least one object on which the selected action is to be performed, and rendering the location, the selected at least one action to be performed, and the AR object on the user device.

18 Claims, 6 Drawing Sheets

METHOD AND SYSTEM FOR RENDERING CONTENT IN LOW LIGHT CONDITION FOR FIELD ASSISTANCE

TECHNICAL FIELD

The present subject matter is generally related to assisting field agents and engineers in low light conditions, more particularly, but not exclusively, to a method and a system for rendering Augmented Reality (AR) content in low light condition for field assistance.

BACKGROUND

In recent years, many assisting systems for field agents and engineers have been developed to help the field agents with various kind of tasks like repair, maintenance, system check, etc. These assisting systems are designed in such a way that environment in each image frame is visible and computation performed with data are captured in visible condition. But in case of dark condition, the photons count that a camera captures decreases drastically, and the environment may not be visible. In such scenarios, the assisting system fails to compute all the tasks that are dependent on the visibility of environment i.e. the assisting systems are not able to predict actions for the field agents in low light condition like night, dark environments, etc.

The information disclosed in this background of the disclosure section is for enhancement of understanding of the general background of the invention and should not be taken as an acknowledgement or any form of suggestion that this information forms the prior art already known to a person skilled in the art.

SUMMARY

In an embodiment, the present disclosure may relate to a method of rendering Augmented Reality (AR) content in low light condition for field assistance. The method includes receiving real-time input data from a user device in a low light condition. The input data comprises unprocessed image frames captured from the user device. In the next step, the method includes identifying at least one object from the real-time input data and corresponding operational state of the at least one object based on a correlation of the at least one object in the input data and corresponding operational state of the at least object with pre-stored objects and corresponding operational state of the pre-stored objects. The pre-stored objects and corresponding operational state of the pre-stored objects are identified based on training a recurrent neural network with a set of image frames. In the following step, the method includes predicting at least one action to be performed on the identified at least one object. The at least one action is predicted based on the trained recurrent neural network, and the predicted at least one action is to be performed at a location of the identified at least one object in the identified real-time input data. In the subsequent step, the method includes extracting an AR object associated with the identified at least one object on which the selected action is to be performed. In the final step, the method includes rendering the location, the selected at least one action to be performed, and the AR object on the user device.

In an embodiment, the present disclosure may relate to a field assisting device for rendering AR content in low light condition for field assistance. The field assisting device may include a processor and a memory communicatively coupled to the processor, wherein the memory stores processor-executable instructions, which on execution, cause the processor to receive real-time input data from a user device in a low light condition. The input data comprises unprocessed image frames captured from the user device. In the next step, the field assisting device identifies at least one object from the real-time input data and corresponding operational state of the at least one object based on a correlation of the at least one object in the input data and corresponding operational state of the at least object with pre-stored objects and corresponding operational state of the pre-stored objects. The pre-stored objects and corresponding operational state of the pre-stored objects are identified based on training a recurrent neural network with a set of image frames. In the following step, the field assisting device predicts at least one action to be performed on the identified at least one object. The at least one action is predicted based on the trained recurrent neural network, and the predicted at least one action is to be performed at a location of the identified at least one object in the identified real-time input data. In the subsequent step, the field assisting device extracts an AR object associated with the identified at least one object on which the selected action is to be performed. In the final step, the field assisting device renders the location, the selected at least one action to be performed, and the AR object on the user device.

In an embodiment, the present disclosure may relate to a non-transitory computer readable medium including instructions stored thereon that when processed by at least one processor cause a field assisting device to perform operations comprising receiving real-time input data from a user device in a low light condition. The input data comprises unprocessed image frames captured from the user device. In the next step, at least one object from the real-time input data and corresponding operational state of the at least one object is identified based on a correlation of the at least one object in the input data and corresponding operational state of the at least object with pre-stored objects and corresponding operational state of the pre-stored objects. The pre-stored objects and corresponding operational state of the pre-stored objects are identified based on training a recurrent neural network with a set of image frames. In the following step, at least one action to be performed on the identified at least one object is predicted. The at least one action is predicted based on the trained recurrent neural network, and the predicted at least one action is to be performed at a location of the identified at least one object in the identified real-time input data. In the subsequent step, an AR object associated with the identified at least one object on which the selected action is to be performed is extracted. In the final step, the location, the selected at least one action to be performed, and the AR object on the user device is rendered.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

Figure 1:
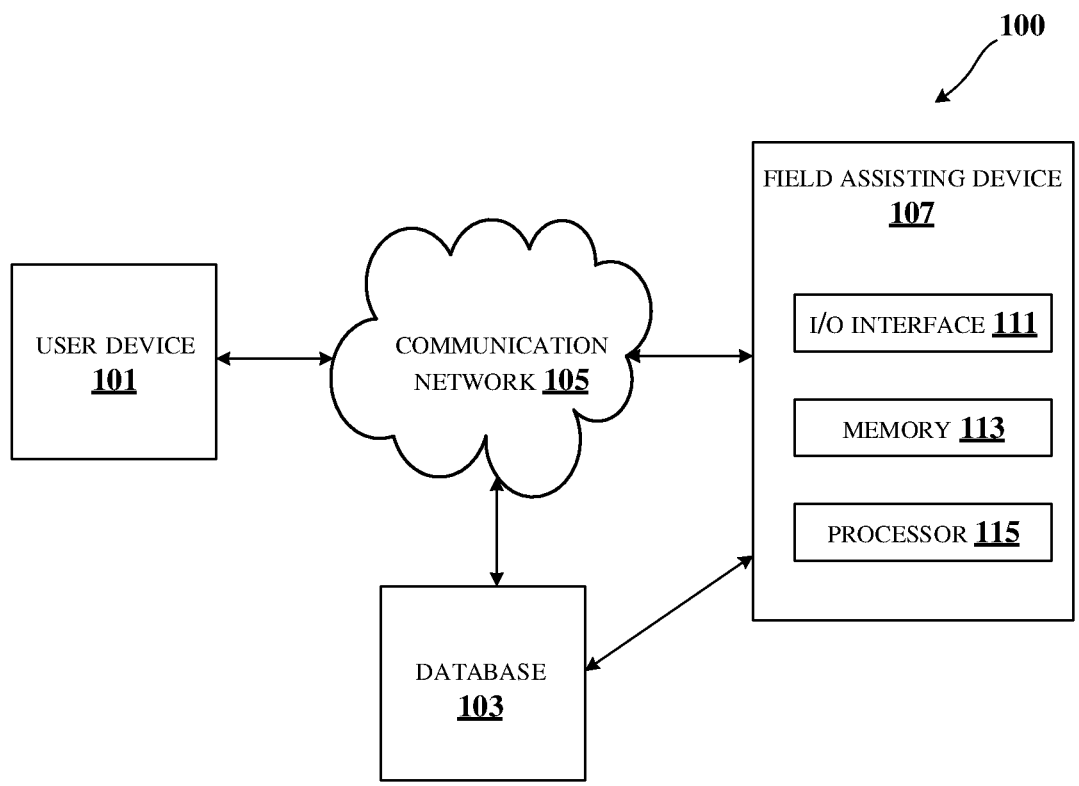
FIG. 1 illustrates an exemplary environment for rendering AR content in low light condition for field assistance in accordance with some embodiments of the present disclosure.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure provide a mechanism that takes a video in a stream of raw data (unprocessed data) format instead of traditional processed format and divide the stream of raw data into individual image frames of raw data format. While capturing video, traditional method tends to compress the information obtained by camera sensor, as a result, there may be important information loss. To overcome this limitation, the present disclosure uses raw (unprocessed) data for computation rather than compressed data for low light conditions. In the present disclosure, lighting conditions that refer to low light to dark environment having a condition in which number of lumens associated with the received raw (unprocessed) data is less than a predefined threshold. In an exemplary scenario, this predefined threshold may be 5 lumens. The image frames of raw data format are used to obtain various objects. These objects are passed through a trained recurrent neural network that is used to extract the action related to an object. The sequence of image frames when passed though the recurrent neural network, the network obtains the actual situation and predicts the action to be performed. This recurrent neural network is used to check the machines and obtain a state of the machine for which field assistance need to perform an action. The network is, also, used to detect the action performed by the field agent and compute the state based on the field agents' action. Once the state and the action that needs to be performed is identified, the field assisting device determines a location of the action to be performed. The field assisting device obtains an Augmented Reality (AR) image of the object from a database. This AR image along with action prediction is passed to an AR device, which helps field agents to perform the task in low light conditions. After completion of the task, the field assisting device computes the state of the machine and if required, computes the whole process repeatedly till the task needed to be done by field agent is completed.

FIG. 1 illustrates an exemplary environment for rendering AR content in low light condition for field assistance in accordance with some embodiments of the present disclosure.

As shown in the FIG. 1, the environment 100 includes a user device 101, a database 103, a communication network 105 and a field assisting device 107. The user device 101 may be connected through the communication network 105 to the field assisting device 107. In an embodiment, the field assisting device 107 may be part of the user device 101. In an embodiment, the user device 101 may include, but is not limited to, a mobile terminal, a Head-Mounted Display (HMD), a camera and an AR device or a combination of these devices. The user device 101 may provide real-time input data to the field assisting device 107 via the communication network 105 and may communicate with the field assisting device 107 via the communication network 105 for field assistance. The real-time input data may be unprocessed sequence of image frames or images captured from the user device 101. In one embodiment raw images captured by a camera of the user device 101, which are not processed by the user device 101 are provided as the input data to the field assisting device 107. The user device 101 may capture input data at real-time when a field agent focuses the user device 101 on an environment for performing tasks like repair, maintenance, system integrity check, etc. The communication network 105 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi, Bluetooth and the like.

In the embodiment, the field assisting device 107 may render AR content that includes AR object, at least one action to be performed and the location of the AR object on the user device for providing field assistance in low light condition. The field assisting device 107 may include an I/O interface 111, a memory 113 and a processor 115. The I/O interface 111 may be configured to receive the input data from the user device 101. Analogously, the I/O interface 111 may be configured to communicate with the user device 101 to assist field agents. The I/O interface 111 may employ communication protocols/methods such as, without limitation, audio, analog, digital, monoaural, Radio Corporation of America (RCA) connector, stereo, IEEE®-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI®), Radio Frequency (RF) antennas, S-Video, Video Graphics Array (VGA), IEEE® 802.11b/g/n/x, Bluetooth, cellular e.g., Code-Division Multiple Access (CDMA), High-Speed Packet Access (HSPA+), Global System for Mobile communications (GSM®), Long-Term Evolution (LTE®), Worldwide interoperability for Microwave access (WiMax®), or the like.

The input data received by the I/O interface 111 may be stored in the memory 113. The memory 113 may be communicatively coupled to the processor 115 of the field assisting device 107. The memory 113 may, also, store processor instructions which may cause the processor 115 to execute the instructions for rendering AR content for field assistance in low light condition. The memory 113 may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

The processor 115 may include at least one data processor for rendering AR content for field assistance. The processor 115 may include specialized processing units such as integrated system (bus) controllers, memory management control units, floating point units, graphics processing units, digital signal processing units, etc.

In the embodiment, the field assisting device 107 may exchange data with a database 103 directly or through the communication network 105. The database 103 may be populated or stored with pre-stored data that includes at least one of pre-stored input data, pre-stored objects, corresponding operation states and one or more actions associated with the corresponding operation state. Here, the pre-stored input data may refer to data received from one or more user devices 101 by the field assisting device 107 during training phase. The pre-stored input data may be a real-time video stream or offline video stream in low light environment. These video streams may be divided into individual image frames for further computation by different modules (described later in the description). The pre-stored input data may be used during training to train models. The pre-stored objects may be extracted from the pre-stored input data captured in the low light condition. The pre-stored input data, like the real-time input data, may be unprocessed sequence of image frames or images captured from the user device, for example, from camera sensors.

The database 103 may, also, be updated at pre-defined intervals of time. These updates may be related to at least one of the pre-stored input data, the pre-stored objects, the corresponding operation states and the one or more actions associated with the corresponding operation state for adaptive learning.

Figure 2:
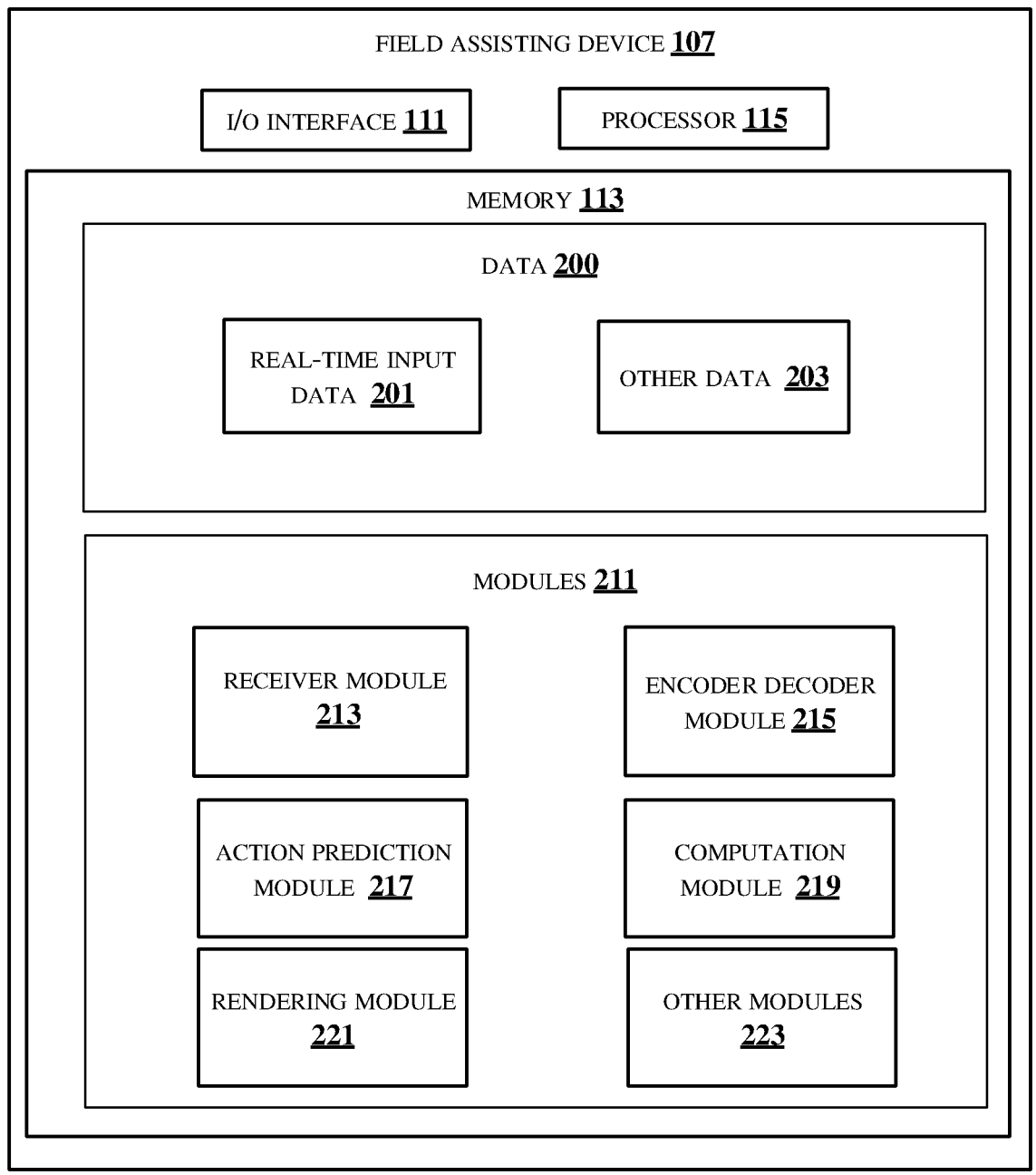
FIG. 2 shows a detailed block diagram of a field assisting device in accordance with some embodiments of the present disclosure.

FIG. 2 shows a detailed block diagram of a field assisting device in accordance with some embodiments of the present disclosure.

The field assisting device 107, in addition to the I/O interface 111 and processor 115 described above, may include data 200 and one or more modules 211, which are described herein in detail. In the embodiment, the data 200 may be stored within the memory 113. The data 200 may include, for example, real-time input data 201 and other data 203.

The real-time input data 201 may include unprocessed sequence of image frames or images captured from the user device 101. The unprocessed image frames or images received by the field assisting device 107 from the user device 101 are stored in the real-time input data 201.

The other data 203 may store data, including temporary data and temporary files, generated by one or more modules 211 for performing the various functions of the field assisting device 107.

In the embodiment, the data 200 in the memory 113 are processed by the one or more modules 211 present within the memory 113 of the field assisting device 107. In the embodiment, the one or more modules 211 may be implemented as dedicated hardware units. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In some implementations, the one or more modules 211 may be communicatively coupled to the processor 115 for performing one or more functions of the field assisting device 107. The said modules 211 when configured with the functionality defined in the present disclosure will result in a novel hardware.

In one implementation, the one or more modules 211 may include, but are not limited to, a receiver module 213, an encoder decoder module 215, an action prediction module 217, a computation module 219 and a rendering module 221. The one or more modules 211 may, also, include other modules 223 to perform various miscellaneous functionalities of the field assisting device 107.

The receiver module 213 may receive real-time input data from the user device 101 in a low light condition. The input data comprises unprocessed image frames captured from the user device 101. For instance, video captured in low light may be divided into individual frames or images for further processing. Each frame's format is unprocessed (raw) data from camera sensor. During training phase, a real-time video stream or offline video stream in low light environment may be divided into individual sequential frames or images. Images may be sequenced as $I=(I_1, I_2, I_3, I_n)$—where $I_i$'s may be ordered sequence of images for each $i=1, 2, \ldots n$. The features may be extracted from these images to train models.

During testing phase, a real time video stream may be received, and the video stream may be divided into individual sequential frames. Here, the images may be sequenced as $I=(IR_1, IR_2, IR_3, \ldots, IR_n)$—where $IR_n$'s is ordered sequence of images for each $i=1, 2, \ldots n$. The features may be extracted from these sequential images to test the models in real-time.

The encoder decoder module 215 may identify at least one object from the real-time input data and corresponding operational state of the at least one object based on a correlation of the at least one object in the input data and corresponding operational state of the at least object with pre-stored objects and corresponding operational state of the pre-stored objects. The pre-stored objects and corresponding operational state of the pre-stored objects may be identified based on training a recurrent neural network with a set of image frames. The real-time input data i.e. individual sequential frames obtained from the receiver module 213 are sent to the encoder decoder module 215. The encoder decoder model 215 may be trained where input may be short exposure image unprocessed (raw) data and its label may be long exposure image frames. As input and output are different, this model may be trained on short and long exposure data to derive the image features such as pixel values, colour features, texture features, etc. In long exposure, exposure time is long while capturing the photography. In short exposure, the exposure time is shorter than the long exposure while capturing the photography. Hence, the longer exposure images have clear images, whereas the short exposure images have less clear images compared to the longer exposure images. The encoder decoder model may help in extracting the features and objects from these images. For example: In any image frame from which the image features are to be obtained to detect objects such as a nut, screw, pipe, etc., the encoder decoder model may be used to extract these features. During training phase, from the sequence of frames or images, a recurrent neural network may be trained with short exposure low light images obtained from video stream with the corresponding long exposure image. This may be done by training the recurrent neural network on short exposure images. In the training phase, this trained model may learn to identify different objects (i.e. pre-stored objects) in the short exposure low light image, which may be used for identifying correlation with different objects from the real-time input data.

In testing phase, the individual sequential frames obtained from a real time video stream may be processed with the pre-trained model to identify the objects in the frame.

Let $F=(F_1, F_2, F_3, \ldots, F_n)$, where $F_i$'s may be ordered sequence of objects for each $i=1, 2, \ldots n$ obtained from sequence of frames.

Here, for each frame contains multiple objects which are given below $F_1=(F_{11}, F_{12}, F_{13}, \ldots, F_{1m})$: $F_{1j}$—may be the $j^{th}$ visual object extracted from $1^{st}$ frame for each $j=1, 2, \ldots, m$ $F_2=(F_{21}, F_{22}, F_{23}, \ldots, F_{2m})$: $F_{2j}$—may be the $j^{th}$ visual object extracted from $2^{nd}$ frame for each $j=1, 2, \ldots, m$

. . .

$F_n=(F_{n1}, F_{n2}, F_{n3}, \ldots, F_{nm})$: $F_{nj}$—may be the $j^{th}$ visual object extracted from $n^{th}$ frame for each $j=1, 2, \ldots, m$ The action prediction module 217 may predict at least one action to be performed on the identified at least one object. The at least one action is predicted based on the trained recurrent neural network, and the predicted at least one action is to be performed at a location of the identified at least one object in the identified real-time input data. In training phase, the object (F) obtained from the encoder decoder module 215 may be used to train recurrent neural network like Long Short-Term Memory (LSTM) model with action on specific object from which state of the machine may be computed. As the objects obtained from the encoder decoder module 215 may be sequential, the recurrent neural network may be able to obtain context of the environment that further may help to predict the action and also, the state changes in the machine. Let objects be $F=(F_1, F_2, F_3, \ldots, F_n)$ where $F_i$'s may be ordered sequence of object obtained from sequence of frames for each $i=1, 2, 3, \ldots n$. Using the recurrent neural network, an object in a frame may be identified including contextual meaning in a sequence of frames. Here, the contextual meaning may refer to the actions associated in the image frame such as the screw is present in the image frame, the screw is dropped down from the equipment, the wind wheel is rotating clockwise are the actions or contextual information of the image frame. The contextual meaning may, also, be referred as screen description of the image frame. This may be obtained from the object identified in the image frame and the natural language of the image frame to derive the description from the object. The model may further predict action on a specific object, and this may be used to compute the state of the machine.

$$S=F(A,O)$$

Where A may represent Action and O may represent Object. F may represent the function that will compute the state of the system.

In testing phase, the objects (F) may given to trained LSTM models and the output will be the action on a specific object predicted by the model and the state of the machine.

For example, a gear in a machine is turning in anti-clockwise with a constant speed in dark conditions. The objects are extracted from each unprocessed image frames and are sent to the LSTM model. The model predicts that the action regarding the specific object, i.e. the gear is moving anti-clock direction and the state of the machine that the machine is running.

The rendering module 221 may extract an AR object associated with the identified at least one object on which the selected action is to be performed. In real scenario, a field agent may need to know where the location of the action on specific object in real time. Additionally, the location should be visible to the field agent to perform various task. For this reason, using the action predicted on the specific object and state of the machine, the location environment that needs to be visible to the field agent may be computed. This computation may be performed by the computation module 219. Once the location of environment in the image is computed, based on object that specific image of the object may be enhanced or augmented by the rendering module 221. Here, the augmented image of the object may be referred as the AR object. The AR object, location of the object, predicted action and state of the machine may be sent for processing the computation module 219.

The computation module 219 may compute sensory information suitable for the user device from at least one of the identified at least one object, corresponding operation state, the selected at least one action to be performed and the AR object. The computed sensory information may be sent along with the location to the user device for field assistance. The sensory information and the location may be sent to the field agent via the user device 101 such that the filed agent is instructed to do a specific job. The sensory information may be obtained by computing a function P( ) that may be defined as SI=P(A, O, S, I). SI may represent sensory information, A may represent action, O may represent object, S may represent state of machine and I may represent enhanced image of the required environment (AR object). The computed sensory information may be sent to the rendering module 221.

The rendering module 221 may render the location, the selected at least one action to be performed, and the AR object on the user device 101. The rendering module 221 may render the location of the object in the image frame where the action is to be performed. The rendering module 221 may, also, render all the features associated with the object and provide the boundaries of the object to perform the action. For example, to know where a screw needs to be tightened from the image frame, that portion of the screw may be rendered from the image frame and the step to be performed associated with the action. Once the sensory information is sent to the user device 101, the user device 101 based on the sensory information may instruct the field agent about the task that needs to be performed by sending signal to field agent's eye and ear. The field agent on receiving the signal may be able to look at the environment where the task must be done. Once the action is performed, the whole process may repeat till all tasks are completed and machine is in stable state.

Figure 3:
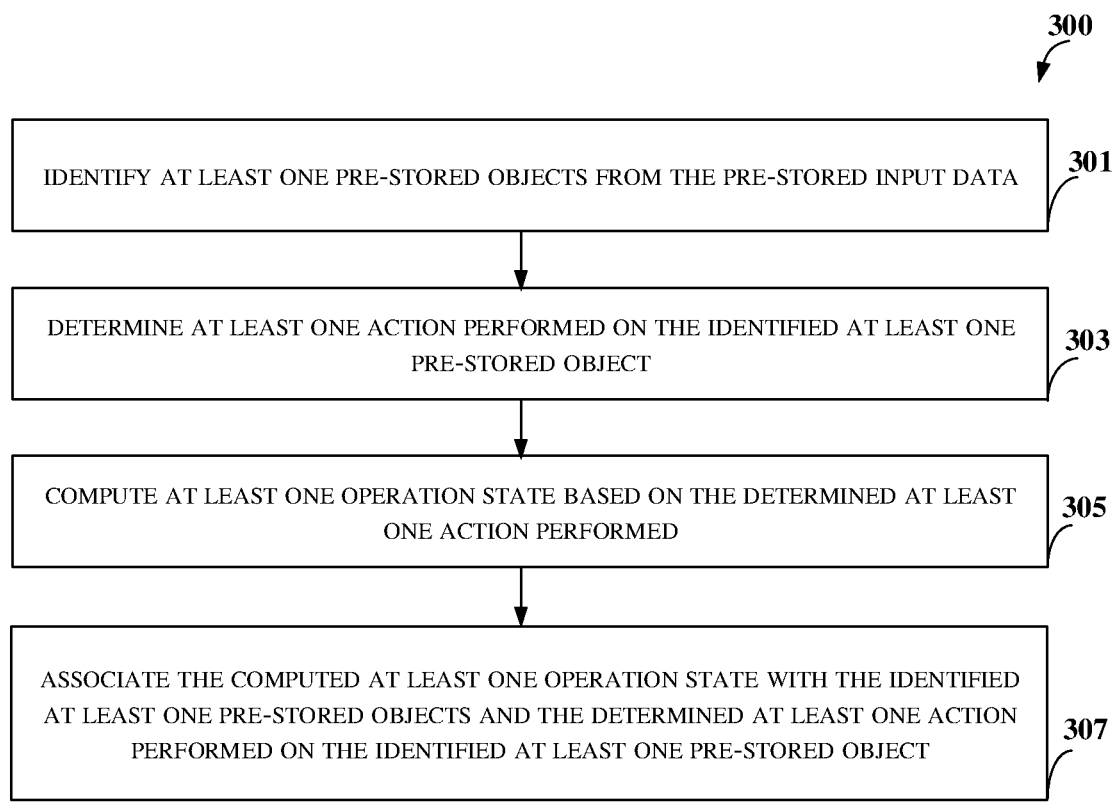
FIG. 3 illustrates a flowchart showing a method for training of a recurrent neural network to be used in rendering AR content in low light condition for field assistance in accordance with some embodiments of present disclosure.

FIG. 3 illustrates a flowchart showing a method for training of a recurrent neural network to be used in rendering AR content in low light condition for field assistance in accordance with some embodiments of present disclosure.

As illustrated in FIG. 3, the method 300 includes one or more blocks for training of the recurrent neural network. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the encoder decoder module 215 may identify at least one pre-stored objects from the pre-stored input data. The pre-stored input data may be received and sent to the encoder decoder module 215 by the receiver module 213 (not shown in FIG. 3) during training of the recurrent neural network. The pre-stored objects may be extracted from pre-stored input data captured in the low light condition. The pre-stored input data may be at least one of image and video.

At block 303, the action prediction module 217 may determine at least one action performed on the identified at least one pre-stored object.

At block 305, the computation module 219 may compute at least one operation state based on the determined at least one action performed.

At block 307, the computation module 219 may associate the computed at least one operation state with the identified at least one pre-stored objects and the determined at least one action performed on the identified at least one pre-stored object. The pre-stored objects, corresponding operation states and the one or more actions associated with the corresponding operation state may be stored in the database 103 for field assistance in real-time scenario.

Figure 4A:
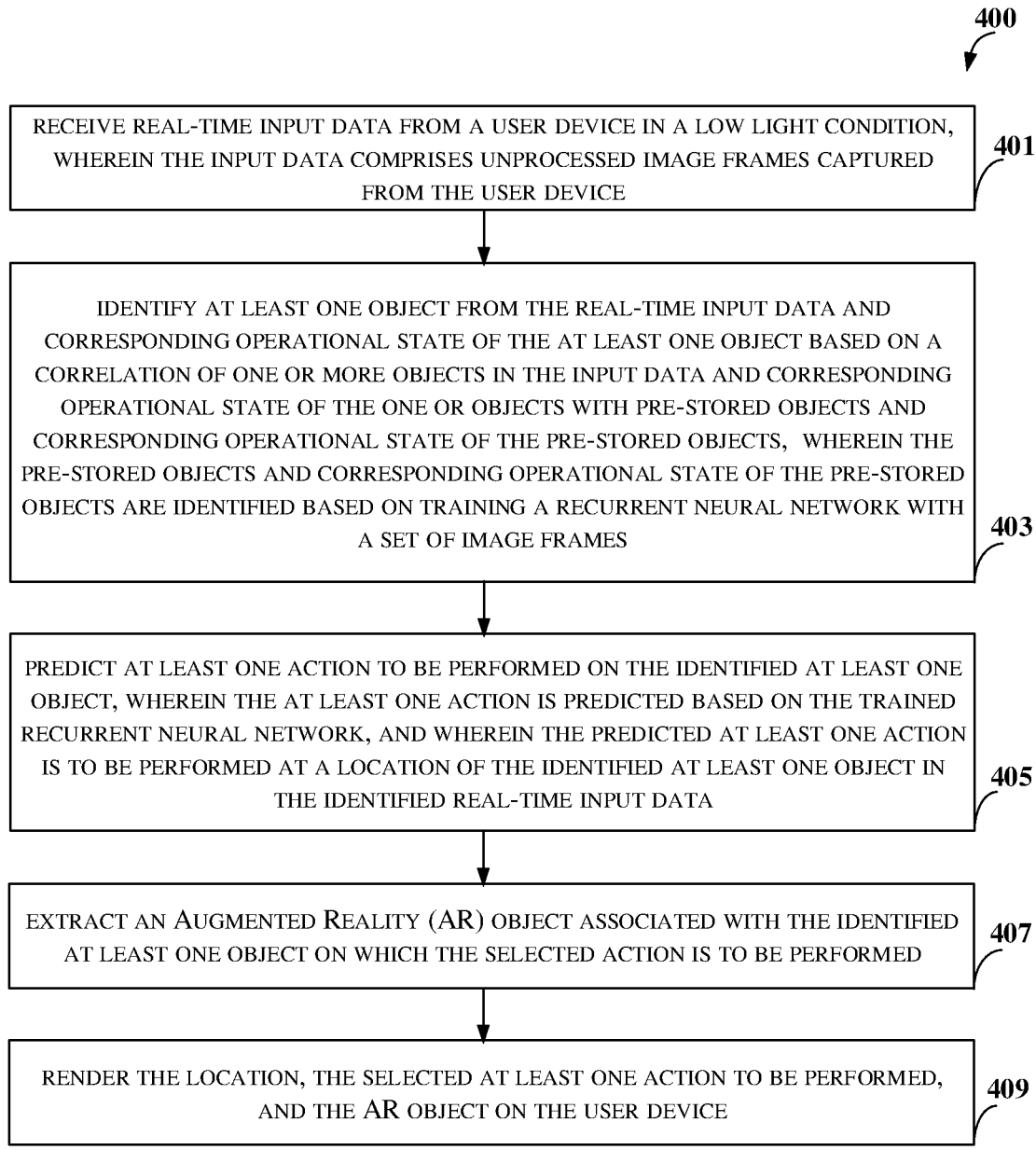
FIG. 4a-FIG. 4b illustrates an exemplary representation of rendering AR content in low light condition for field assistance in accordance with some embodiments of present disclosure.
Figure 4B:
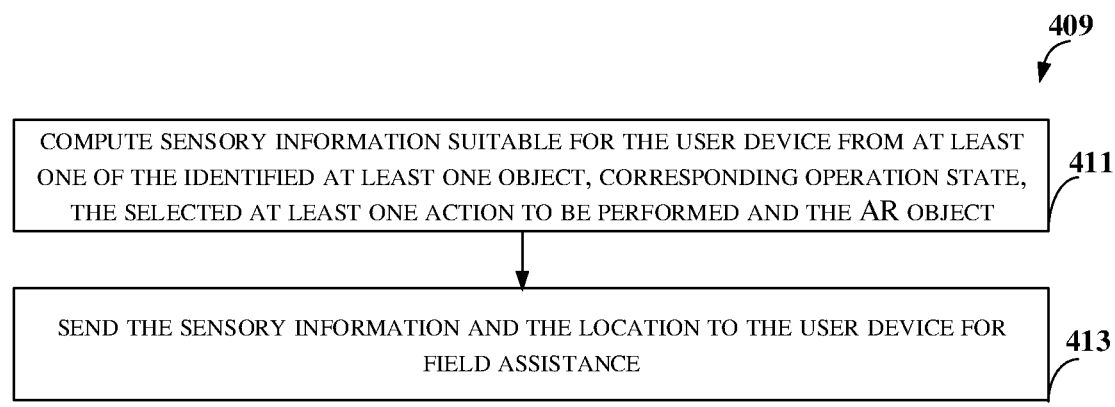

FIG. 4a-FIG. 4b illustrates an exemplary representation of rendering AR content in low light condition for field assistance in accordance with some embodiments of present disclosure.

As illustrated in FIG. 4a-FIG. 4b, the method 400 includes one or more blocks for rendering AR content in low light condition for field assistance. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the receiver module 213 may receive real-time input data from the user device 101 in a low light condition. The input data may comprise unprocessed image frames captured from the user device 101. Here, the image frames may include at least one of image and video captured from the user device 101. The low light condition may refer to a condition in which number of lumens associated with the received unprocessed image frames are less than a predefined threshold. This predefined threshold may be 5 lumens.

At block 403, the encoder decoder module 215 may identify at least one object from the real-time input data and corresponding operational state of the at least one object based on a correlation of the at least one object in the input data and corresponding operational state of the at least object with pre-stored objects and corresponding operational state of the pre-stored objects. The pre-stored objects and corresponding operational state of the pre-stored objects may be stored in the database 103. The pre-stored objects and corresponding operational state of the pre-stored objects may be identified based on training a recurrent neural network with a set of image frames.

At block 405, the action prediction module 217 may predict at least one action to be performed on the identified at least one object. The at least one action may be predicted based on the trained recurrent neural network. The predicted at least one action may be performed at a location of the identified at least one object in the identified real-time input data.

At block 407, the rendering module 221 may extract an AR object associated with the identified at least one object on which the selected action is to be performed.

At block 409, the rendering module 221 may render the location, the selected at least one action to be performed, and the AR object on the user device 101. The AR object may be rendered in a proximity of the location of the identified at least one object in the identified real-time input data.

FIG. 4b illustrates a flowchart showing a method for computing sensory information for field assistance in accordance with some embodiments of present disclosure.

At block 411, the computation module 219 may compute sensory information suitable for the user device 101 from at least one of the identified at least one object, corresponding operation state, the selected at least one action to be performed and the AR object.

At block 413, the rendering module 221 may send the sensory information and the location to the user device 101 for field assistance.

Few examples are presented below based on FIGS. 4a and 4b.

Example 1: Suppose a machine in dark needs to be switched on. The field agent goes to the machine and the camera ON his AR device captures a stream of video data of raw (unprocessed) format for surveillance of the machine.

From the video data, the field assisting device 107 forms image frames and identifies the objects in the image frames. Once the field assisting device 107 predicts the button needs to be ON, the field assisting device 107 uses the location of the button in the image frame to extract the AR image of that button. This AR image along with the action that buttons needs to be pressed is sent to the field agent using AR device. Using the AR image of the button, the field agent sees the button and gets instructions to switch ON the button.

Example 2: Suppose a lever needs to be pulled up in a machine to restart it in dark conditions. Once the field agent reaches the machine, the user device will capture stream of video data and pass the stream of video data to the field assisting device 107. The field assisting device 107 forms image frames and identifies the objects in the image frames. The field assisting device 107 predicts the state of machine (i.e. the machine is OFF) and further predicts the action to change the state of the machine (i.e. the lever needs to be pushed up to start the machine). In the next step, the field assisting device 107 identifies the location on the lever in the image frame to extract an AR image of the lever. This AR image along with the action that lever needs to push up, is sent to the field agent using AR device. The field agent now sees the lever and gets instructions to push the lever up.

Some of the advantages of the present disclosure are listed below.

The present disclosure provides real-time assistance to field engineers to perform a task in dark or low light conditions, thereby, preventing accidents and protecting the field engineers.

The present disclosure uses raw data or unprocessed image frames, which have more information to derive actions and objects in the image frames.

The present disclosure allows computation of sensory information of the image frames and sends this information to AR devices to visualize the actions and objects in real-time.

Computing System

Figure 5:
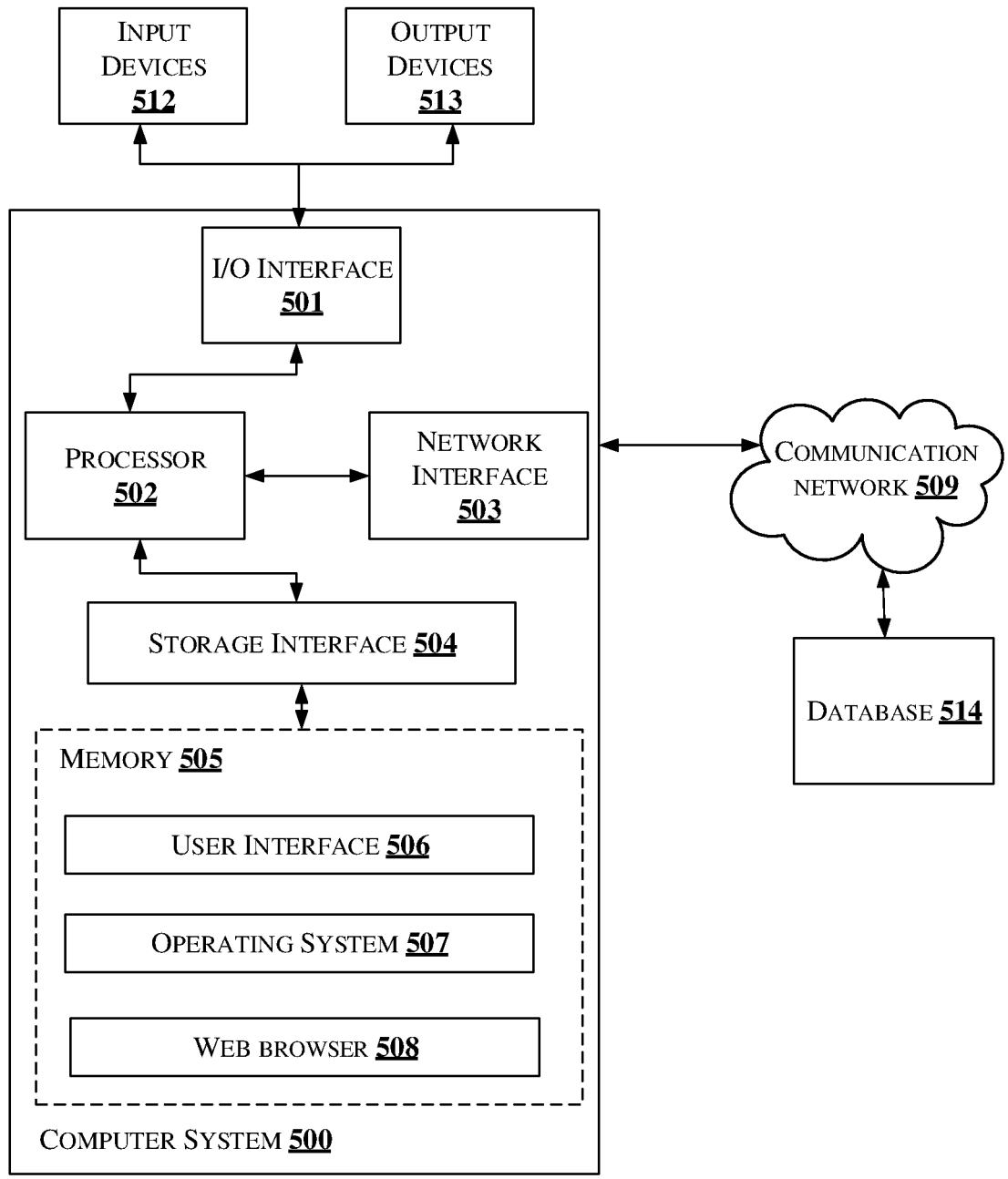
FIG. 5 illustrates a block diagram of an exemplary computer system for implementing embodiments consistent with the present disclosure.

FIG. 5 illustrates a block diagram of an exemplary computer system for implementing embodiments consistent with the present disclosure. In an embodiment, the computer system 500 may be used to implement the field assisting device 107. The computer system 500 may include a central processing unit ("CPU" or "processor") 502. The processor 502 may include at least one data processor for rendering AR content in low light condition for field assistance. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, Radio Corporation of America (RCA) connector, stereo, IEEE®-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI®), Radio Frequency (RF) antennas, S-Video, Video Graphics Array (VGA), IEEE® 802.11b/g/n/x, Bluetooth, cellular e.g., Code-Division Multiple Access (CDMA), High-Speed Packet Access (HSPA+), Global System for Mobile communications (GSM®), Long-Term Evolution (LTE®), Worldwide interoperability for Microwave access (WiMax®), or the like.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the field assisting device 107. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. The communication network 509 may include, without limitation, a direct interconnection, Local Area Network (LAN), Wide Area Network (WAN), wireless network (e.g., using Wireless Application Protocol), the Internet, etc. Using the network interface 503 and the communication network 509, the computer system 500 may communicate with a database 514. The network interface 503 may employ connection protocols include, but not limited to, direct connect, Ethernet (e.g., twisted pair 10/100/1000 Base T), Transmission Control Protocol/Internet Protocol (TCP/IP), token ring, IEEE® 802.11a/b/g/n/x, etc.

The communication network 509 includes, but is not limited to, a direct interconnection, a Peer to Peer (P2P) network, Local Area Network (LAN), Wide Area Network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, Serial Advanced Technology Attachment (SATA), Integrated Drive Electronics (IDE), IEEE®-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system 500 may implement web browser 508 stored program components. Web browser 508 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, ADOBE® FLASH®, JAVASCRIPT®, JAVA®, Application Programming Interfaces (APIs), etc. The computer system 500 may implement a mail server (not shown in FIG. 5) stored program component. The mail server may be an Internet mail server such as Microsoft Exchange, or the like. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. The computer system 500 may implement a mail client (not shown in FIG. 5) stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3, 4a and 4b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
|---|---|
| Reference number | Description |
| 100 | Environment |
| 101 | User device |
| 103 | Database |
| 105 | Communication network |
| 107 | Field assisting device |
| 111 | I/O interface |
| 113 | Memory |
| 115 | Processor |
| 200 | Data |
| 201 | Real-time input data |
| 203 | Other data |
| 211 | Modules |
| 213 | Receiver module |
| 215 | Encoder decoder module |
| 217 | Action prediction module |
| 219 | Computation module |
| 221 | Rendering module |
| 223 | Other module |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | Database |

What is claimed is:

1. A field assistance system for rendering Augmented Reality (AR) content in low light condition for field assistance, the field assistance system comprising:
   a processor; and
   a memory communicatively coupled to the processor, wherein the memory stores processor-executable instructions, which on execution, cause the processor to:
      receive real-time input data from a user device in a low light condition, wherein the real-time input data comprises unprocessed image frames captured from the user device;
      identify at least one object from the real-time input data and corresponding operational state of the at least one object based on a correlation of the at least one object in the real-time input data and corresponding operational state of the at least object with pre-stored objects and corresponding operational state of the pre-stored objects, wherein the pre-stored objects and corresponding operational state of the pre-stored objects are identified based on training a recurrent neural network with a set of image frames;
      predict at least one action to be performed on the identified at least one object, wherein the at least one action is predicted based on the trained recurrent neural network, and wherein the at least one action is to be performed at a location of the identified at least one object in the identified real-time input data;
      extract an Augmented Reality (AR) object associated with the identified at least one object on which the at least one action is to be performed;
      render the location, the at least one action to be performed, and the AR object on the user device;
      compute sensory information suitable for the user device from at least one of the identified at least one object, corresponding operation state, the at least one action to be performed and the AR object, wherein the sensory information is computed to provide real-time visualization of the at least one action and the identified at least one object; and
      send the sensory information and the location to the user device for field assistance.

2. The field assistance system as claimed in claim 1, wherein the low light condition refers to a condition in which number of lumens associated with the received unprocessed image frames are less than a predefined threshold.

3. The field assistance system as claimed in claim 1, wherein the database comprises the pre-stored objects, corresponding operation states and the one or more actions associated with the corresponding operation state.

4. The field assistance system as claimed in claim 1, wherein the pre-stored objects are extracted from pre-stored input data captured in the low light condition, and wherein the pre-stored input data is at least one of image and video.

5. The field assistance system as claimed in claim 1, wherein the AR object is rendered in a proximity of the location of the identified at least one object in the identified real-time input data.

6. The field assistance system as claimed in claim 1, the system causes the processor to:
   identify at least one pre-stored objects from the pre-stored input data;
   determine at least one action performed on the identified at least one pre-stored object;
   compute at least one operation state based on the determined at least one action performed; and
   associate the computed at least one operation state with the identified at least one pre-stored objects and the determined at least one action performed on the identified at least one pre-stored object.

7. A method of rendering Augmented Reality (AR) content in low light condition for field assistance, the method comprising:
   receiving, by a field assisting device, real-time input data from a user device in a low light condition, wherein the real-time input data comprises unprocessed image frames captured from the user device;
   identifying, by the field assisting device, at least one object from the real-time input data and corresponding operational state of the at least one object based on a correlation of the at least one object in the real-time input data and corresponding operational state of the at least object with pre-stored objects and corresponding operational state of the pre-stored objects, wherein the pre-stored objects and corresponding operational state of the pre-stored objects are identified based on training a recurrent neural network with a set of image frames;
   predicting, by the field assisting device, at least one action to be performed on the identified at least one object, wherein the at least one action is predicted based on the trained recurrent neural network, and wherein the at least one action is to be performed at a location of the identified at least one object in the identified real-time input data;

extracting, by the field assisting device, an Augmented Reality (AR) object associated with the identified at least one object on which the at least one action is to be performed;

rendering, by the field assisting device, the location, the at least one action to be performed, and the AR object on the user device;

computing, by the field assisting device, sensory information suitable for the user device from at least one of the identified at least one object, corresponding operation state, the at least one action to be performed and the AR object, wherein the sensory information is computed to provide real-time visualization of the at least one action and the identified at least one object; and sending, by the field assisting device, the sensory information and the location to the user device for field assistance.

8. The method as claimed in claim 7, wherein the low light condition refers to a condition in which number of lumens associated with the received unprocessed image frames are less than a predefined threshold.

9. The method as claimed in claim 7, wherein the database comprises the pre-stored objects, corresponding operation states and the one or more actions associated with the corresponding operation state.

10. The method as claimed in claim 7, wherein the pre-stored objects are extracted from pre-stored input data captured in the low light condition, and
wherein the pre-stored input data is at least one of image and video.

11. The method as claimed in claim 7, wherein the AR object is rendered in a proximity of the location of the identified at least one object in the identified real-time input data.

12. The method as claimed in claim 7, wherein training of the recurrent neural network comprises:
identifying, by the field assisting device, at least one pre-stored objects from the pre-stored input data;
determining, by the field assisting device, at least one action performed on the identified at least one pre-stored object;
computing, by the field assisting device, at least one operation state based on the determined at least one action performed; and
associating, by the field assisting device, the computed at least one operation state with the identified at least one pre-stored objects and the determined at least one action performed on the identified at least one pre-stored object.

13. A non-transitory computer readable medium including instructions stored thereon that when processed by at least one processor, cause a field assisting device to perform operations comprising:
receiving real-time input data from a user device in a low light condition, wherein the real-time input data comprises unprocessed image frames captured from the user device;

identifying at least one object from the real-time input data and corresponding operational state of the at least one object based on a correlation of the at least one object in the real-time input data and corresponding operational state of the at least object with pre-stored objects and corresponding operational state of the pre-stored objects, wherein the pre-stored objects and corresponding operational state of the pre-stored objects are identified based on training a recurrent neural network with a set of image frames;

predicting at least one action to be performed on the identified at least one object, wherein the at least one action is predicted based on the trained recurrent neural network, and wherein the at least one action is to be performed at a location of the identified at least one object in the identified real-time input data;

extracting an Augmented Reality (AR) object associated with the identified at least one object on which the at least one action is to be performed;

rendering the location, the at least one action to be performed, and the AR object on the user device;
compute sensory information suitable for the user device from at least one of the identified at least one object, corresponding operation state, the at least one action to be performed and the AR object, wherein the sensory information is computed to provide real-time visualization of the at least one action and the identified at least one object; and send the sensory information and the location to the user device for field assistance.

14. The medium as claimed in claim 13, wherein the low light condition refers to a condition in which number of lumens associated with the received unprocessed image frames are less than a predefined threshold.

15. The medium as claimed in claim 13, wherein the database comprises the pre-stored objects, corresponding operation states and the one or more actions associated with the corresponding operation state.

16. The medium as claimed in claim 13, wherein the pre-stored objects are extracted from pre-stored input data captured in the low light condition, and wherein the pre-stored input data is at least one of image and video.

17. The medium as claimed in claim 13, wherein the AR object is rendered in a proximity of the location of the identified at least one object in the identified real-time input data.

18. The medium as claimed in claim 13, the instructions cause the processor to:
identify at least one pre-stored objects from the pre-stored input data;
determine at least one action performed on the identified at least one pre-stored object;
compute at least one operation state based on the determined at least one action performed; and
associate the computed at least one operation state with the identified at least one pre-stored objects and the determined at least one action performed on the identified at least one pre-stored object.

* * * * *